United States Patent [19]
Harrell

[11] Patent Number: 6,053,964
[45] Date of Patent: Apr. 25, 2000

[54] APPARATUS AND METHOD FOR APPLYING A LEACHING SOLUTION TO ORE

[76] Inventor: Gary W. Harrell, HCR1 Box 224, Plainview, Tex. 79072

[21] Appl. No.: 08/939,751

[22] Filed: Sep. 29, 1997

[51] Int. Cl.⁷ ............................. E21B 43/28; C22B 13/08
[52] U.S. Cl. ............................. 75/712; 75/743; 266/101; 266/170
[58] Field of Search ........................ 75/712, 743; 266/44, 266/101, 170

[56] References Cited

U.S. PATENT DOCUMENTS

| | | | |
|---|---|---|---|
| 4,739,973 | 4/1988 | Herndon | 266/101 |
| 5,005,806 | 4/1991 | Krauth . | |
| 5,030,279 | 7/1991 | Krauth . | |

OTHER PUBLICATIONS

Chamberlain, P. G., Pojar, M. G. "Gold and Silver Leaching Practices in the United States," Bureau of Mines Publication Circular 8969. U.S. Department of the Interior, Apr. 1984.

*Primary Examiner*—Prince Willis
*Assistant Examiner*—Tima McGuthry-Banks
*Attorney, Agent, or Firm*—Trask, Britt & Rossa

[57] ABSTRACT

An apparatus for applying a leaching solution to a mass of ore includes a plurality of first tubes which are connected to a supply of leaching solution. Each of the first tubes is fitted with emitters which are positioned at spaced intervals along the length of each first tube. The first tubes are connected with a manifold on their distal ends. A second tube is connected to the manifold. The second tube is fitted with a sprinkler which is positioned to distribute leaching solution over the surface area of the ore mass which is positioned intermediate adjacent emitters.

13 Claims, 4 Drawing Sheets

APPARATUS AND METHOD FOR APPLYING A LEACHING SOLUTION TO ORE

BACKGROUND OF THE INVENTION

1. Field of the Invention

This invention relates to the field of hydrometallury. More specifically, the invention is directed to a lixiviation apparatus and method for applying a leaching solution to crushed ore.

2. State of the Art

An approach of common usage in extracting metals from ore is the technique known as percolation. In this technique a leaching solution is applied to a stationary mass of crushed ore. The solution interacts with specific metals contained in the ore to reduce a metal ladened solution, the metals being contained in the solution in the form of a salt. The solution is then removed from the ore mass. The solution is subsequently processed to precipitate the metal.

Various factors influence the rate at which the metal is removed from the ore mass subsequent to the introduction of the leaching solution to the ore. Notably, the quantity of leaching solution being distributed over the ore, the strength of that solution, the depth of the pad on which the ore is positioned and the particle size of the ore will all effect the rate of removal of the metal from the ore being treated.

In the conventional approach, a mass of ore is spread over an impervious surface known as a "pad." A pad may be formed by sheets of an impervious material, such as plastic. Alternative pad constructions have employed asphalt and compacted clay. It is also common that the pad be constructed on a slope. Adoption of a sloped configuration assists the processor in recovering the metal ladened solution subsequent to its passage through the ore mass.

Recently, efforts have been directed to methods of applying the leaching solution to the ore mass. It has been recognized that prior methods have tended to result in inexact applications of the solution to the ore mass. Of further concern has been the evaporation and degradation of the leaching solution which results from large applications of the solution to an ore mass in relative short periods of time.

Within the last several years that has been a concerted effort, primarily in South America, to leach ore on On-Off pads. This entails moving the ore to be processed on a pad, leaching the ore for 45 to 90 days and then subsequently removing the ore and discarding it in a dump site. In this technique, any metal remaining in the volume of unleached ore remaining on the pad prior to the removal of the ore is discharged with the treated ore resulting in a loss of potentially recoverable metal. In conventional practice the ore mass on the pad may reach depths as shallow as 2.4 meters to as deep as 7.6 meters. The use of On-Off pads has caused considerable concern in the industry in view of the potential for the considerable loss of metal in unreacted ore. It has been determined that the shallower the ore placement on the pad the higher the percentage of metal loss per leach cycle.

One recent effort of note in this area is disclosed in U.S. Pat. No. 5,005,806 (Krauth). In the Krauth disclosure, a arrangement of piping is positioned over and/or through the ore mass. The piping includes a number of laterally-spaced pipes which are fitted at spaced intervals along their respective lengths with emitters. These emitters are of the type commonly associated with drip irrigation. This arrangement produces a grid-like array of piping with each emitter being positioned at a uniform spaced distance from adjacent emitters. The Krauth system addresses many of the problems conventionally associated with percolation treatment of ores. Notably, the leaching solution is applied is relatively small quantities over time which tends to alleviate the concerns about premature evaporation of the solution and its degradation by ultraviolet rays.

While the Krauth system addresses many of the concerns which have been raised by those skilled in the art, it has been noted that the use of the Krauth system results in many areas of the ore mass remaining untreated by the leaching solution. Specifically, as shown in FIGS. 1 and 2 of the drawings, the natural flow patterns of the leaching solution from the emitters produces a generally upright cone shaped distribution pattern. Little, if any of the leaching solution, is directed laterally from the emitter to reach those areas of the ore mass which lie between adjacent emitters and near the surface of the ore mass. It follows that the flow patterns of the leaching solution in conjunction with the positioning of the emitters produces a number of "dry cone" shaped areas which remain untouched by the leaching solution. It should be recognized that being untouched by the leaching solution, these dry cones are not processed for the purpose of removing concentrations of metals which may be present in these areas.

It has also been discovered that the use of emitters for the purpose of applying leaching solution also presents problems for maintaining the proper operation of the emitters. Due to the relatively slow flow velocities encountered in the supply piping to the emitters, the small size of the nozzles found in conventional emitter structures, the small diameters of the tubing conventionally utilized with such emitters and the nature of the leaching solution the emitters tend to become clogged within relatively short periods of time resulting in very poor uniformity in the application of the leaching solution to the ore mass. It therefore becomes necessary for steps to be taken to unclog the emitters and thereby continue operation of the percolation system. Understandably, these cleaning operations disrupt the processing time of the ore mass.

The instant invention is directed to an apparatus and method for use in addressing the above identified concerns.

SUMMARY OF THE INVENTION

The invention includes a plurality of first tubes which are adapted for placement on and/or within a mass of ore to be treated. The tubes are configured to receive a supply of leaching solution from a supply of same and thereafter direct that solution to locations throughout the mass of ore. The first tubes are interconnected to a manifold assembly. Each of the first tubes is fitted along its length with one or more emitters. Each of the emitters is configured to receive leaching solution from its respective first tube and thereafter distribute the leaching solution in a predetermined, controlled fashion onto the ore mass. The arrangement of the first tubes and their associated emitters results in each emitter being spacedly distanced from adjacent emitters. In a preferred system, the distance separating adjacent emitters is maintained generally uniform.

A second tube is connected to the manifold assembly. This second tube is fitted with a sprinkler. The sprinkler is adapted to receive a quantity of leaching solution from the manifold assembly and distribute that solution over the ore mass. The sprinkler is positioned to distribute leaching solution over the quantities of the ore mass which are positioned between, i.e. intermediate, the various emitters. In a preferred configuration, a control apparatus is connected to the manifold assembly. The control apparatus operates to direct leaching solution to the sprinkler intermittently and preferably during weather conditions favorable to the application of leaching solution to the surface of the ore mass.

In operation, leaching solution is first directed into the first tubes over a predetermined time period in order to permit a timely distribution of solution to the ore mass. During this operation of the emitters, the second tube is closed thereby precluding flow of the solution to the sprinkler. At intermittent intervals, the second tube is opened. This results in an increased flow velocity of leaching solution through the first tubes, the manifold into the second tube. This flow into the second tube is typically timed to occur under those weather conditions which mitigate the loss of leaching solution from the ore mass, e.g. at night and when no wind is present.

The instant invention provides several benefits. First, in contrast to prior percolation efforts, the leaching solution is effectively applied to those regions of the ore mass which are not reached by the emitters. This produces enhanced metal recovery during the percolation processing. Secondly, the leaching solution must pass through the first tubes in order to reach the manifold which subsequently feeds the second tube and the sprinkler. The operation of the sprinkler requires a higher fluid flow through the first tubes than is otherwise produced therein by the operation of the emitters. The generation of these higher flow velocities in the first tubes operates to remove clogging and the matter which may produce clogging from the first tubes. It follows that the sprinkler of the instant apparatus may be operated intermittently to not only ensure that the areas of the ore mass not being reached by the emitters is properly treated, but furthermore, the operation of the instant invention tends to retain the first tubes and their associated emitters relatively free of clogging which in turn decreases the downtime which results from efforts required to otherwise free the emitters from clogging.

DETAILED DESCRIPTION OF THE ILLUSTRATED EMBODIMENT

Figure 1:
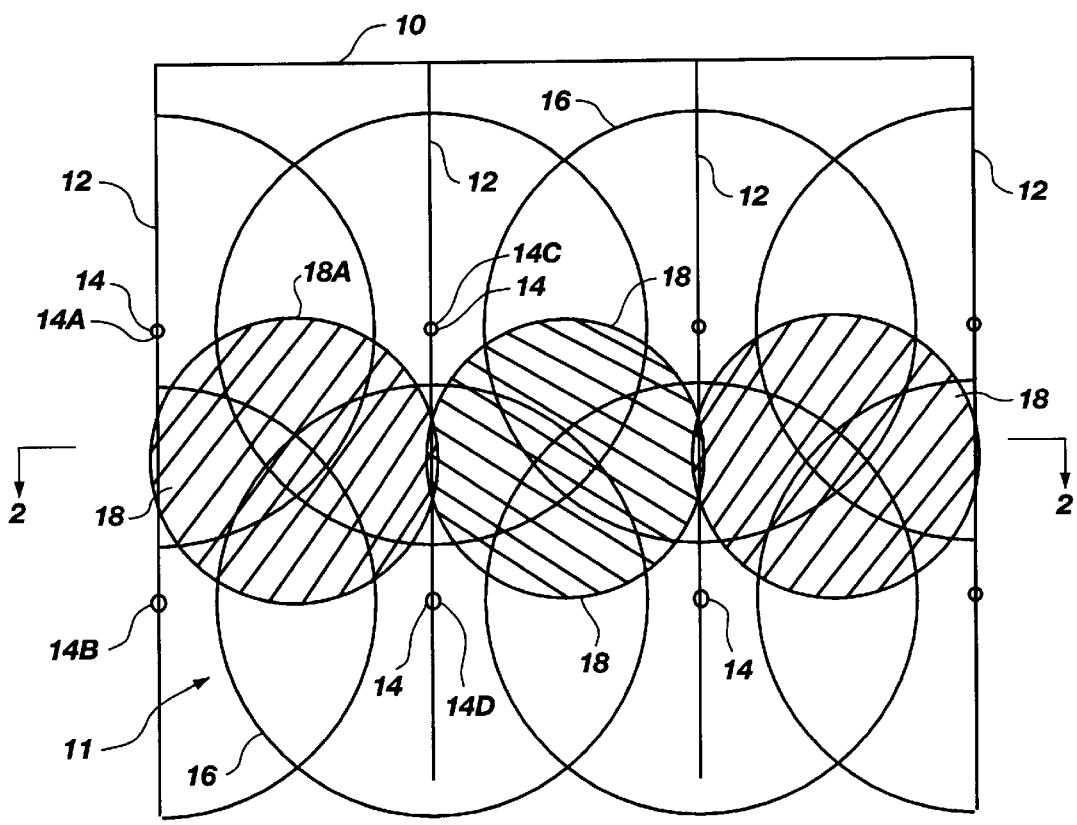
FIG. 1 is a top plan view of a prior art emitter percolation system, illustrating in hatching those areas of the ore mass in which leaching solution is not distributed by the emitters.
Figure 2:
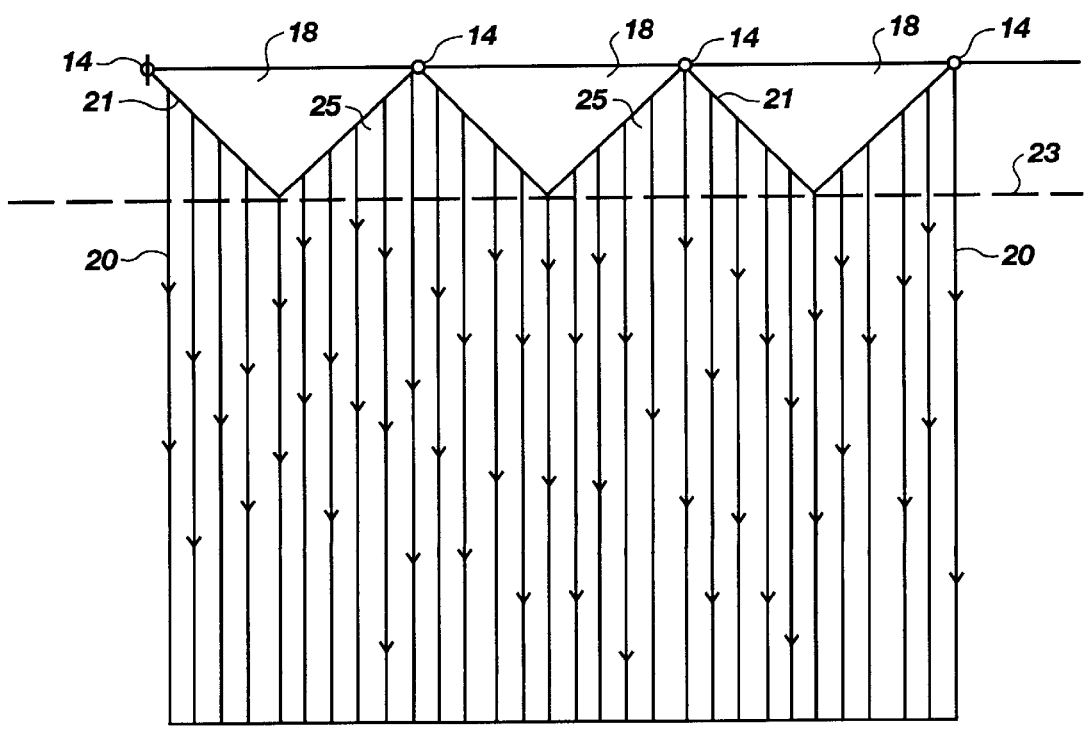
FIG. 2 is a cross sectional view of the system of FIG. 1, taken along section lines 2—2, illustrating the configuration of those areas of the ore mass which are not irrigated by the flow of leaching solution from the emitters.

FIGS. 1 and 2 illustrate the leach solution flow patterns of a conventional percolation system. As illustrated a solution supply line 10 is fitted with a number of auxiliary feed lines 12. Feed lines 12 extend from the supply line 10 at spaced intervals along the length of the supply line 10. Emitters 14 are connected to each auxiliary line 12 at spaced intervals along the length of each auxiliary line 12. The supply line 10 and auxiliary lines 12 are positioned over a mass of ore 11. FIG. 1 is a top plan view of the system and illustrates the flow pattern of several of the emitters 14. As illustrated the solution tends to flow outwardly from the emitter to form a generally circularly configured flow pattern 16. The hatched circular regions depict areas of the ore mass which are positioned between or intermediate adjacent emitters 14. For example, region 18A illustrates the region which is positioned between emitters 14A, 14B, 14C, and 14D. FIG. 2 is a vertical sectional view of the system shown in FIG. 1, taken along sectional lines 2—2. As shown the flow direction 20 of leaching solution distributed by each of the emitters 14 is shown as being generally vertical with a flow in a lateral direction being generally along a sloped linear line 21. The flow pattern of each emitter can be view as establishing two flow regions. In the region below the hypothetical line 23, the entire mass of the ore is generally covered with solution. In the region above the hypothetical line 23 the flow pattern below each emitter 14 tends to form an upright cone shaped configuration 25, which is illustrated in vertical section in FIG. 2 and from top plan view in FIG. 1. The area of the ore mass which is contacted with the solution defines the perimeter of selected areas of the ore mass which are not contacted by the solution. These non-contacted areas or "dry" areas are identified by the hatched regions 18. As illustrated by FIGS. 1 and 2, these dry areas tend to assume the configuration of inverted cones. FIG. 2 illustrates that the flow pattern isolates regions, designated as "dry cones", are formed between adjacent emitters.

In a conventional drip solution system wherein the lateral distance separating emitters is between 61 and 91 centimeters and the longitudinal distance separating adjacent emitters is between 45 and 91 centimeters the average height of the dry cones illustrated in FIG. 2 is approximately 38 to 76 centimeters. Assuming a distance of 76 centimeters lateral and longitudinal spacing for adjacent emitters in the grid shown in FIG. 1 and a dry cone height and base radius of both 38 centimeters this would yield a dry cone volume of 0.057 cubic meters per 0.58 square meters of surface area of the ore mass. Assuming a conventional pad size of 40 meters by 396 meters, this would mean that in a conventional pad having a depth greater than 76 centimeters that 1,555 cubic meters of ore mass would be found within a dry cone region. Recognizing that the material found within the dry cone is not reacted with the leaching solution and therefore the metal content of the dry cone is lost in the conventional processing scheme, it is then recognized that under common practice that approximately 4 percent of the ore mass is not processed due to a failure to completely distribute the leaching solution to selected regions of the ore mass. The instant invention is directed to providing a supply of leaching solutions to these dry cone areas thereby processing the ore contained within those areas.

Figure 3:
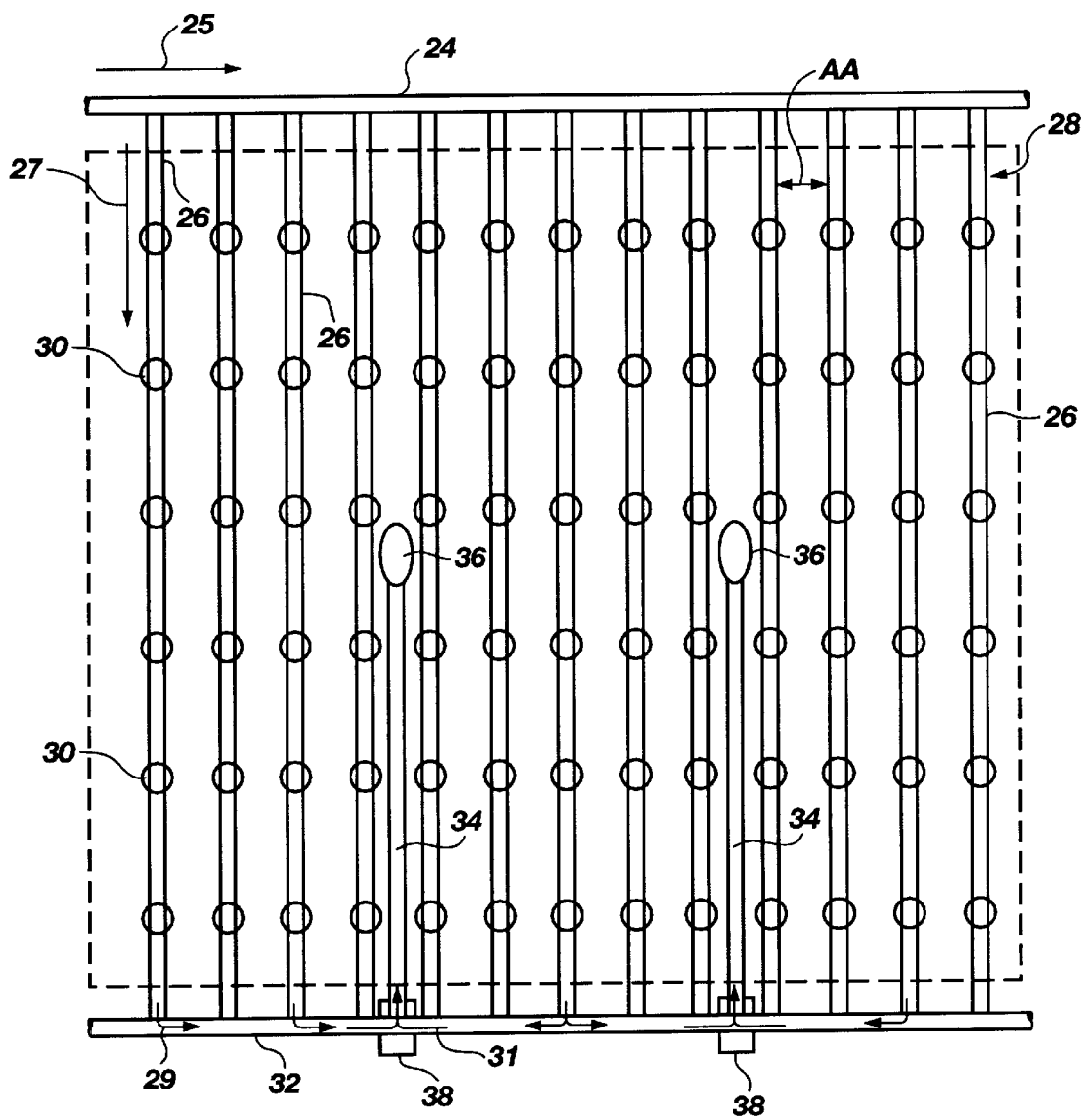
FIG. 3 is a top plan view of the tubing arrangement of the instant invention.

FIG. 3 is a top plan view of the apparatus of the invention. As shown a supply line 24 is formed of a hollow tubular pipe which is positioned on the edge of a quantity of crushed ore 28. At spaced intervals along the length of the supply line 24, a first tube or pipe 26 is connected to the supply line 24. The lumen of each first tube 26 is in fluid communication with the lumen of the supply line 24. In a preferred construction the inner diameter of a first tube 26 is approximately 1.27 centimeters. The first tubes are laterally spaced from one another over the surface of the ore mass 28. As shown, in a preferred embodiment, each of the first tubes 26 is linear in configuration and is oriented to be parallel to the other first tubes 26. In a preferred configuration the first tubes 26 are spaced between 61 centimeters to 91 centimeters (about 24 inches to 36 inches) from one another, i.e. the distance AA is between (61 to 91 centimeters (24 to 36 inches). Spacedly positioned along the length of each of the first tubes 26 is a plurality of emitters 30. These emitters are of the general type conventionally used in drip irrigation. A representative emitter which may be utilized in the invention is disclosed in U.S. Pat. No. 3,792,588. Each of the emitters 30 are connected to its respective first tube 26 so as to be in fluid communication with the lumen of that first tube thereby providing a means whereby leaching solution contained within the lumen of the first tube may pass through the emitter 30 and thereafter be distributed over the ore mass 28. In a preferred construction a typical emitter flow rate is two gallons per hour.

Each of the first tubes 26 is connected on its distal end to a manifold 32 which is shown positioned on the perimeter of the ore mass 28. While the manifold is shown positioned at the perimeter of the ore mass is should be understood that the manifold could be positioned over the ore mass itself. The manifold 32 is connected to each first tube 26 such that a fluid communication is established between the lumen of the manifold and the lumen of each first tube 26.

A second tube 34 is shown connected to the manifold 32. This second tube 34 is connected to the manifold whereby the lumen of the second tube 34 is in fluid communication with the lumen of the lumen of the manifold 32. The second tube extends generally parallel to the first tubes 26 over the ore mass 28. The second tube is fitted with a sprinkler head 36. The sprinkler head 36 is adapted for reaching leaching solution from the lumen of the second tube 34 and thereafter distributing that solution over the ore mass 28.

A control apparatus 38 is shown connected to the manifold 32 proximate the interconnection of the second tube 34 to the manifold. The control apparatus which may be an valve, e.g. an automatic valve is adapted to control the flow of leaching solution into the second tube 34.

Figure 4:
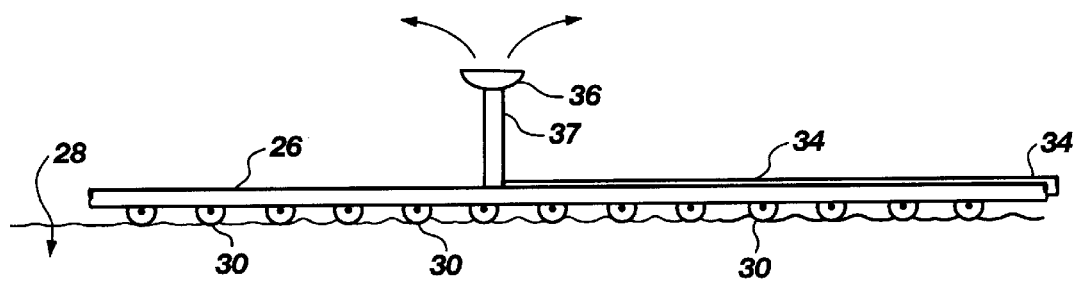
FIG. 4 is a sectional side view of the tubing arrangement of FIG. 3.

FIG. 4 is a sectional side view of the system shown in FIG. 3. As shown the emitters 30 are positioned directly above the ore mass 28. The emitters are positioned to distribute leaching solution directly onto the ore mass surface. The sprinkler head 36 is shown mounted on a riser 37. In contrast to the emitters 30, the sprinkler 36 is positioned to distribute leaching solution upwardly and outwardly so that the leaching solution eventually falls on the surface of the ore mass 28.

Figure 5:
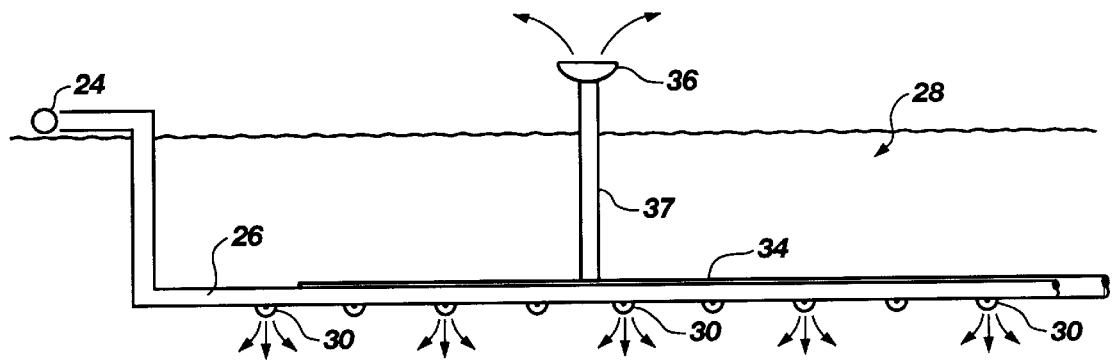
FIG. 5 is a sectional side view of an alternative embodiment of the tubing arrangement of the instant invention.

FIG. 5 illustrates an embodiment of the invention wherein the first tubes are positioned within the ore mass 28 itself. The supply line 24 is shown on top of the ore mass 28. The sprinkler head 36 is shown being positioned elevationally above the surface of the ore mass 28 so as to permit the upward and outward spraying of the leaching solution over the surface of the ore mass.

Figure 6:
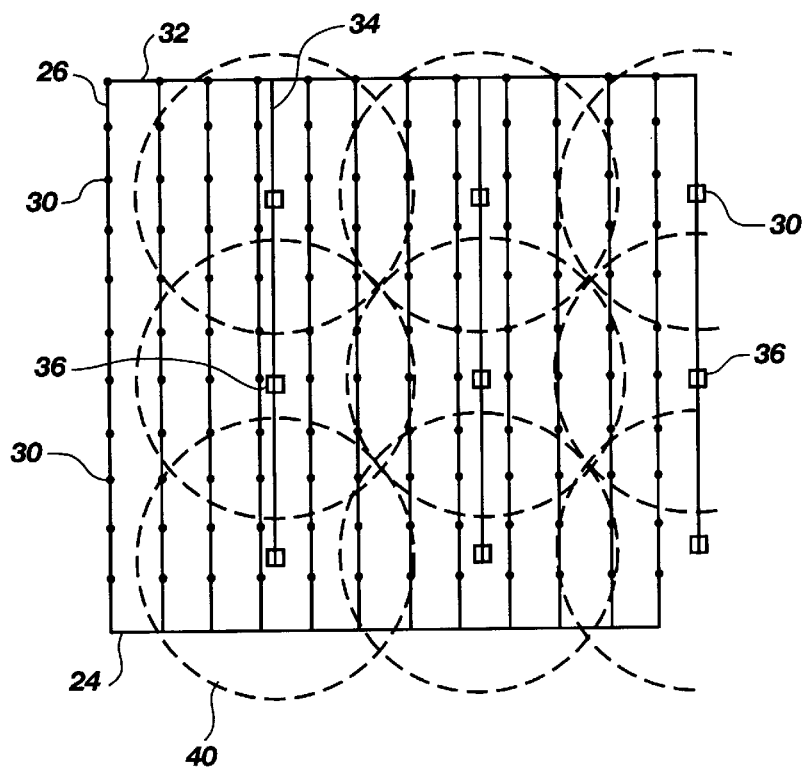
FIG. 6 is a top plan view of a tubing arrangement of the invention, illustrating the flow patterns of the sprinkler assemblies.

FIG. 6 illustrates a configuration of a supply line 24, a series of first tubes 26, a manifold 32 and a series of second tubes 34. The spray patterns of the various sprinkler heads 36 are shown by circles 40. As illustrated, the sprinklers 36 distribute the leaching solution over the surface area of the ore mass which is positioned intermediate of the various emitters 30. It follows that the sprinklers distribute a quantity of leaching solution to the very dry cone areas which were mentioned above as not being reached by the action of the emitters.

Figure 7:
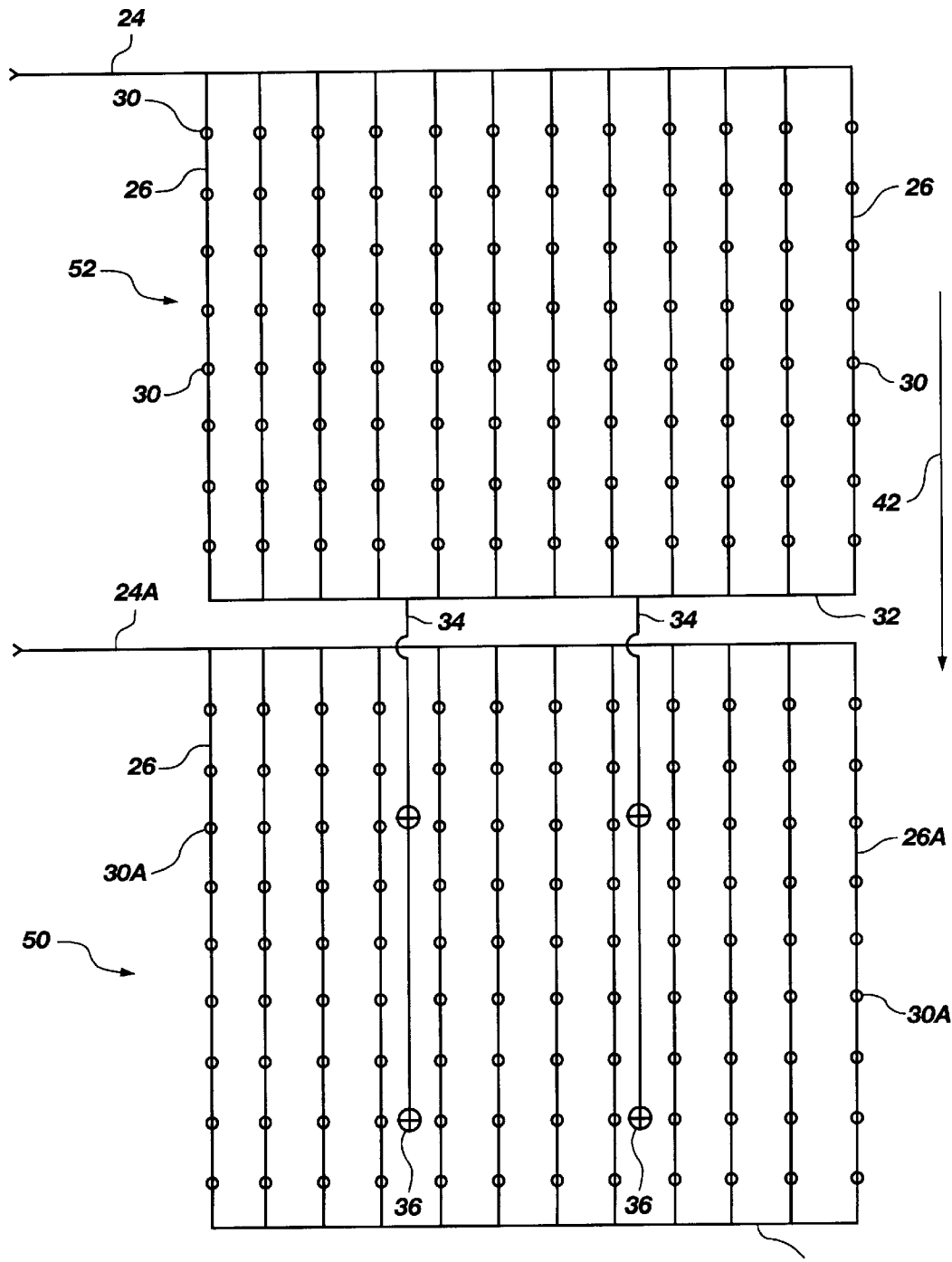
FIG. 7 is a top plan view of an alternative tubing arrangement of the invention.

FIG. 7 illustrates an alternative embodiment of the invention wherein two grids of first tubes are positioned adjacent to one another. In a preferred embodiment, the second grid assembly, generally 50, is positioned elevationally lower than the first grid assembly 52. In this particular embodiment the second tubes 34 of the first grid assembly are utilized to apply leaching solution to the second grid area 50, as opposed to prior embodiments wherein the second tubes 34 would be utilized to apply leaching solution to the first grid assembly. In this alternative embodiment, the hydraulic pressure obtained by drawing the solution from the elevationally higher first grid assembly is utilized to advantage to drive the sprinklers 36 which are positioned in the second grid area.

In operation, referring to FIG. 3, leaching solution is obtained from a supply of same and is introduced under pressure into the system through supply line 24 in the direction indicated by arrow 25. The solution is directed through line 24 and into each of the first tubes 26. The solution flows through the tubes 26 in the direction indicated by arrow 27. As the solution flows through the individual first tubes, the solution passes outwardly through the respective emitters 30 of each first tube 26 thereby being distributed over the ore mass 28. Since the emitters have a relatively slow emission flow rate a quantity of the solution passes into the manifold 32 in the direction indicated by arrow 25. Initially, the control assembly 38 is in a closed position thereby precluding the passage of solution into the second tube 34. At predetermined intervals, e.g. for a few hours each night, especially when low wind conditions exist, the control assembly 38 is activated to open the access to second tube 34 thereby allowing the solution to pass through second tube 34 and into sprinkler 36 as indicated by arrow 25. The solution is thereafter directed outwardly from the sprinkler 36 and over the surface area of the ore mass. The solution is specifically directed to those areas of the ore mass which are not irrigated by the emitters 30.

This use of the sprinklers 36 provides for a flushing of the emitter lines 26 by using the manifolded emitter lines as a distribution system to feed the sprinklers. This allows for the flushing of the emitter lines into the sprinkler lines and thereafter the debri, which was too large to be discharge through the emitter nozzles and resulting is carried in the solution is discharged on the ore mass through the larger sprinkler nozzles. This few hours of dual operation of both the emitters and the sprinklers allows for the dry cone areas to have solution applied thereto. Solution applied to the dry cone areas subsequently flows downwardly through the normal solution irrigated area of the ore mass and is subsequently retrieved from the pad together with the solution which was introduced to the ore mass through the emitters.

The use of the manifolded emitter lines as distribution feeder lines for the valve controlled sprinkler line eliminates the need for a separate line to feed the sprinklers. Furthermore, the interaction of the emitter lines and the sprinkler lines eliminates the need for a separate collection line for flushing the manifold.

This invention is described with reference to specific embodiments. However, it should be recognized by those skilled in the art that various substitutions cna be made without departing from the spirit and scope of the invention which is defined by the appended claims.

What is claimed is:

1. A percolation apparatus for use in distributing a leaching solution over a quantity of ore positioned atop an impervious bed, said apparatus comprising:

a plurality of first tubes connectable to a source of leaching solution;

a manifold interconnected to each of said first tubes;

a second tube connected to said manifold;

a plurality of emitters, each of said first tubes having several emitters connected thereto spacedly along a length thereof;

control structure for controlling a flow of leaching solution into said second tube; and a sprinkler connected to said second tube, said sprinkler being positioned to distribute a quantity of leaching solution over and above an area positioned intermediate at least two adjacent said emitters.

2. The apparatus of claim 1 further including a control apparatus for intermittently directing a flow of leaching solution through said sprinkler.

3. A percolation apparatus for use in distributing a leaching solution over a quantity of ore positioned atop an impervious bed, said apparatus comprising:

a plurality of first tubes connectable to a source of leaching solution;

a manifold interconnected to each of said first tubes;

a second tube connected to said manifold;

control structure for selectively controlling a flow of leaching solution into said second tube;

a second plurality of first tubes connected to a source of leaching solution, said second plurality of first tubes being positioned elevationally lower than said first plurality of first tubes;

a plurality of emitters, each of said first tubes having several emitters connected thereto spacedly along a length thereof;

a sprinkler connected to said second tube, said sprinkler being positioned to distribute a quantity of leaching solution over and above an area positioned intermediate at least two adjacent said emitters connected to at least one said first tube of said second plurality of first tubes.

4. The apparatus of claim 3 wherein said first tubes are arranged to be parallel to one another.

5. The apparatus of claim 4 wherein one said emitter in each said first tube is intersected by a single straight line oriented orthogonally to each of said first tubes.

6. A percolation apparatus for use in distributing a leach solution over a quantity of ore positioned atop an impervious bed, said apparatus comprising:

a plurality of first tubes connectable to a source of leaching solution;

a manifold interconnected to each of said first tubes;

a second tube connected to said manifold;

a second plurality of first tubes connected to a source of leaching solution, said second plurality of first tubes being positioned elevationally lower than said first plurality of first tubes;

a plurality of emitters, each of said first tubes having several emitters connected thereto spacedly along a length thereof;

a sprinkler connected to said second tube, said sprinkler being positioned to distribute a quantity of leaching solution over and above an area positioned intermediate at least two adjacent said emitters connected to at least one said first tube of said second plurality of first tubes.

7. The apparatus of claim 6 wherein said first tubes of said first plurality of first tubes are oriented to be laterally spaced from one another.

8. The apparatus of claim 6 wherein said first tubes of said second plurality of first tubes are oriented to be laterally spaced from one another.

9. The apparatus of claim 6 further including a control apparatus interconnected with said second tube for intermittently directing a flow of leaching solution through said sprinkler.

10. A method of distributing a leaching solution over a quantity of ore positioned on an impervious bed, said method comprising:

positioning several first tubes in association with said ore, each of said first tubes having a number of emitters connected thereto, said emitters being spacedly positioned along a length of each said first tube;

connecting a first end of each of said first tubes to a source of leaching solution;

interconnecting a second end of each said first tube to a manifold;

providing a second tube which is interconnected with said manifold, said second tube having a sprinkler associated therewith, said sprinkler being positioned to direct a flow of leaching solution over and above an area of ore positioned intermediate two adjacently positioned emitters;

directing a flow of leaching solution through said first tubes and dispensing said leaching solution through said emitters onto said ore; and intermittently directing a flow of leaching solution through said first tubes, subsequently through said manifold and through said second tube to said sprinkler at a flow velocity sufficient to remove debris from said first tubes and dispersing said flow of leaching solution through said sprinkler over and above areas of said ore positioned intermediate at least two adjacently positioned emitters.

11. The method of claim 10 wherein said emitters in adjacently positioned first tubes are positioned between 24 inches to 36 inches from one another.

12. The method of claim 10 wherein a flow of leaching solution is only directed through said sprinkler at night.

13. A method of distributing a leaching solution over a quantity of ore positioned on an impervious bed, said method comprising:

positioning a first plurality of first tubes in association with said ore, each of said first tubes having a number of emitters connected thereto, said emitters being spacedly positioned along a length of each said first tube;

interconnecting said first tubes to a manifold;

positioning a second plurality of first tubes in association with said ore, each of said first tubes having a number of emitters connected thereto, said emitters being spacedly positioned along a length of each said first tube, said second plurality of first tubes being positioned elevationally below said first plurality of first tubes;

providing a second tube which is interconnected with said manifold, said second tube having a sprinkler associated therewith, said sprinkler being positioned to direct a flow of leaching solution over and above an area of ore positioned intermediate two adjacently positioned emitters which are connected to said second plurality of first tubes;

directing a flow of leaching solution through said first tubes and dispensing said leaching solution through said emitters onto said ore; and intermittently directing a flow of leaching solution through said first tubes, subsequently through said manifold and into said second tube during an operation of said sprinkler at a flow velocity sufficient to remove debris from said first tubes and dispersing said leaching solution over and above areas of said ore positioned intermediate at least two adjacently positioned emitters which are connected to said second plurality of first tubes.